United States Patent
Halsey et al.

(10) Patent No.: US 10,939,304 B2
(45) Date of Patent: Mar. 2, 2021

(54) SYSTEM AND METHOD FOR FORECASTING AVAILABILITY OF NETWORK SERVICES DURING FLIGHT

(71) Applicant: SATCOM DIRECT, INC., Melbourne, FL (US)

(72) Inventors: Jason Halsey, Rockledge, FL (US); Ryan Sands, Rockledge, FL (US)

(73) Assignee: Satcom Direct, Inc., Melbourne, FL (US)

( * ) Notice: Subject to any disclaimer, the term of this patent is extended or adjusted under 35 U.S.C. 154(b) by 0 days.

(21) Appl. No.: 16/458,936

(22) Filed: Jul. 1, 2019

(65) Prior Publication Data
US 2020/0008079 A1    Jan. 2, 2020

Related U.S. Application Data

(60) Provisional application No. 62/691,883, filed on Jun. 29, 2018.

(51) Int. Cl.
| | |
|---|---|
| *H04W 16/18* | (2009.01) |
| *H04B 7/185* | (2006.01) |
| *G08G 5/00* | (2006.01) |
| *G01C 21/20* | (2006.01) |
| *G01S 19/42* | (2010.01) |
| *G06T 11/00* | (2006.01) |
| *G06T 11/60* | (2006.01) |

(52) U.S. Cl.
CPC ............ *H04W 16/18* (2013.01); *G01C 21/20* (2013.01); *G01S 19/42* (2013.01); *G08G 5/0039* (2013.01);
(Continued)

(58) Field of Classification Search
CPC ....... G01C 21/20; G01S 19/42; G06T 11/001; G06T 11/60; G08G 5/0039;
(Continued)

(56) References Cited

U.S. PATENT DOCUMENTS

| | | | |
|---|---|---|---|
| 7,079,945 B1* | 7/2006 | Kaplan | G01C 21/26 340/988 |
| 9,858,824 B1* | 1/2018 | Zogg | G08G 5/0034 |

(Continued)

FOREIGN PATENT DOCUMENTS

EP    3244575 A1    11/2017

OTHER PUBLICATIONS

EPO International Search Report and Written Opinion dated Sep. 18, 2019, for International Application No. PCT/US2019/040132, 14 sheets.

*Primary Examiner* — Tan H Trinh
(74) *Attorney, Agent, or Firm* — Lowndes; Stephen C. Thomas; Sean S. Wooden

(57) ABSTRACT

System and method for forecasting availability of network services during flight is provided. The system of the disclosed invention utilizes flight plans and coverage data to provide users aboard aircraft with status of satellite Internet services. The system couples the flight plans with the coverage data to provide information regarding how the flight path of the aircraft will affect availability of Internet services during the flight. The method includes retrieving a flight plan to generate a flight path having one or more waypoints, transmitting one or more service coverage data from service providers, coupling the flight path with the service coverage data to determine portions of the flight path in which the network service is unavailable, and delivering to the users information about the service unavailable portions of the flight path.

18 Claims, 15 Drawing Sheets

(52) U.S. Cl.
CPC ........ *H04B 7/18508* (2013.01); *G06T 11/001* (2013.01); *G06T 11/60* (2013.01)

(58) Field of Classification Search
CPC .............. H04B 7/18508; H04L 41/147; H04L 43/0811; H04W 16/18
USPC .......... 455/12.1, 427, 440; 340/988; 701/13, 701/436
See application file for complete search history.

(56) References Cited

U.S. PATENT DOCUMENTS

| | | | |
|---|---|---|---|
| 2005/0171653 A1* | 8/2005 | Taylor | H04B 7/18508 701/13 |
| 2007/0100538 A1* | 5/2007 | Wise | G01C 23/00 701/436 |
| 2013/0189995 A1* | 7/2013 | Wormald | H04L 67/24 455/440 |
| 2016/0209214 A1* | 7/2016 | Vasek | G01C 23/00 |
| 2016/0300493 A1* | 10/2016 | Ubhi | H04B 7/18504 |
| 2016/0371985 A1* | 12/2016 | Kotecha | B64C 39/024 |
| 2017/0355457 A1* | 12/2017 | Terry | G08G 5/0034 |
| 2018/0247544 A1* | 8/2018 | Mustafic | G08G 5/0069 |
| 2019/0035285 A1* | 1/2019 | Priest | B64C 39/024 |
| 2019/0043368 A1* | 2/2019 | Priest | G08G 5/0069 |
| 2019/0044611 A1* | 2/2019 | Treesh | H04B 7/18541 |
| 2019/0049268 A1* | 2/2019 | Mohan | G08G 5/0047 |
| 2019/0052349 A1* | 2/2019 | Russell | G08G 5/0039 |
| 2019/0259287 A1* | 8/2019 | Mustafic | G08G 5/0034 |
| 2019/0295427 A1* | 9/2019 | Priest | H04W 4/40 |
| 2019/0355262 A1* | 11/2019 | Priest | G08G 5/0039 |
| 2020/0005651 A1* | 1/2020 | Priest | G08G 5/045 |
| 2020/0035110 A1* | 1/2020 | Priest | G06K 9/0063 |

* cited by examiner

FIG. 10

SYSTEM AND METHOD FOR FORECASTING AVAILABILITY OF NETWORK SERVICES DURING FLIGHT

RELATED APPLICATIONS

This application claims priority of U.S. Provisional Application Ser. No. 62/691,883, entitled "AIRCRAFT CONNECTIVITY FORECASTING SYSTEM," filed on Jun. 29, 2018, and herein incorporated by reference in its entirety.

TECHNICAL FIELD

This invention relates to aircraft communications, and in particular to systems, devices, and methods for determining how an aircraft's flight path will affect the availability of Internet services of aircraft passengers while the aircraft is flying, which provides solutions that reside within a customer portal and provides a visual indication of whether an aircraft may expect to have an internet connection along their flight path.

BACKGROUND

Passengers on aircraft, especially private aircraft, are increasingly using Internet services for their digital devices, such as for their smart phones, tablets, laptop computers and the like. A problem occurs when the Internet service of the passengers is interrupted and dropped without any notice to the passengers before the interruption occurs. These disruptions to service have caused loss of communications between the aircraft passengers and other parties. Additionally, these interruptions have resulted in losing data on the digital devices of the passengers, such as losing drafted work products such as draft documents, and the like. Thus, the need exists for solutions to the above problems.

SUMMARY

An advantage of embodiments described herein is to provide systems, devices, and methods for determining and forecasting how an aircraft's flight path will affect the availability of internet services of aircraft passengers while the aircraft is flying. Another advantage of embodiments described herein is to provide systems, devices, and methods for providing a visual indication to passengers aboard an aircraft of whether the aircraft may expect to have an internet connection along their flight path. Further objects and advantages of embodiments described herein will be apparent from the following detailed description of the presently preferred embodiments which are illustrated schematically in the accompanying drawings.

These and other advantages may be provided, for example, by a connectivity forecast system to provide users aboard aircraft with status of network services. The connectivity forecast system communicates with one or more service providers. The connectivity forecast system includes a non-transitory storage medium to store executable instructions and one or more processors to execute the executable instructions that cause the one or more processors to perform operations to provide the status of the network services. The operations include retrieving a flight plan to generate a flight path, retrieving one or more service coverage data from the service providers, coupling the flight path with the service coverage data to generate an integrated flight path that indicates service available and unavailable portions of the flight path, and displaying the integrated flight path. The flight path includes one or more waypoints. The one or more service coverage data is transmitted from the service providers and the service coverage data includes a plurality of sub-coverage data.

The operations may further include updating the one or more service coverage data from the service providers during flight. The coupling the flight path may include interpolating the waypoints to generate intervening waypoints between waypoints. The coupling the flight path may include selecting sub-coverage data that cover regions in which the flight path is formed, determining sub-coverage data, among the selected sub-coverage data, which indicate unavailability of the network services, and determining portions of the flight path in which the network service is unavailable. The determining portions of the flight path may include finding one or more waypoints that are not covered by any of sub-coverage data indicating network service availability. The operations may further include checking changes of the one or more service coverage data periodically or upon receiving information from the service providers during flight, checking changes of the flight plan during flight, updating the one or more service coverage data and the flight plan based on the changes during flight, and updating the integrated flight path based on the updated one or more service coverage data and flight plan.

The connectivity forecast system may further include a display device, and the displaying the integrated flight path may include displaying the integrated flight path on the display device. The connectivity forecast system may communicate with global positioning system (GPS) to identify a current location of the aircraft during flight. The current location of the aircraft may be shown on the displayed integrated flight path. The connectivity forecast system may communicate with a flight operator to retrieve the flight plan.

These and other advantages may also be provided, for example, by a method for providing users aboard aircraft with status of network services. The method includes retrieving a flight plan to generate a flight path, transmitting one or more service coverage data from service providers, storing the service coverage data in database or one or more memories, coupling the flight path with the service coverage data to generate an integrated flight path that indicates service available and unavailable portions of the flight path, and displaying the integrated flight path. The flight path includes one or more waypoints. The service coverage data includes a plurality of sub-coverage data.

The method may further include updating the one or more service coverage data from the service providers during flight. The coupling the flight path may include interpolating the waypoints to generate intervening waypoints between waypoints. The coupling the flight path may include selecting sub-coverage data that cover regions in which the flight path is formed, determining sub-coverage data, among the selected sub-coverage data, which indicate unavailability of the network services, and determining portions of the flight path in which the network service is unavailable. The determining portions of the flight path may include finding one or more waypoints that are not covered by any of sub-coverage data indicating network service availability.

The method may further include transmitting information including a current location of the aircraft from GPS during flight. The displaying the integrated flight path may display the current location of the aircraft on the displayed integrated flight path. The method may further include checking changes of the one or more service coverage data periodically or upon receiving information from the service providers during flight, checking changes of the flight plan during flight, updating the one or more service coverage data and the flight plan based on the changes during flight, and updating the integrated flight path based on the updated one or more service coverage data and flight plan.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 10 shows a screen shot of the connectivity page display of SD PRO where "Forecast" is selected.

DETAILED DESCRIPTIONS

Figure 1:
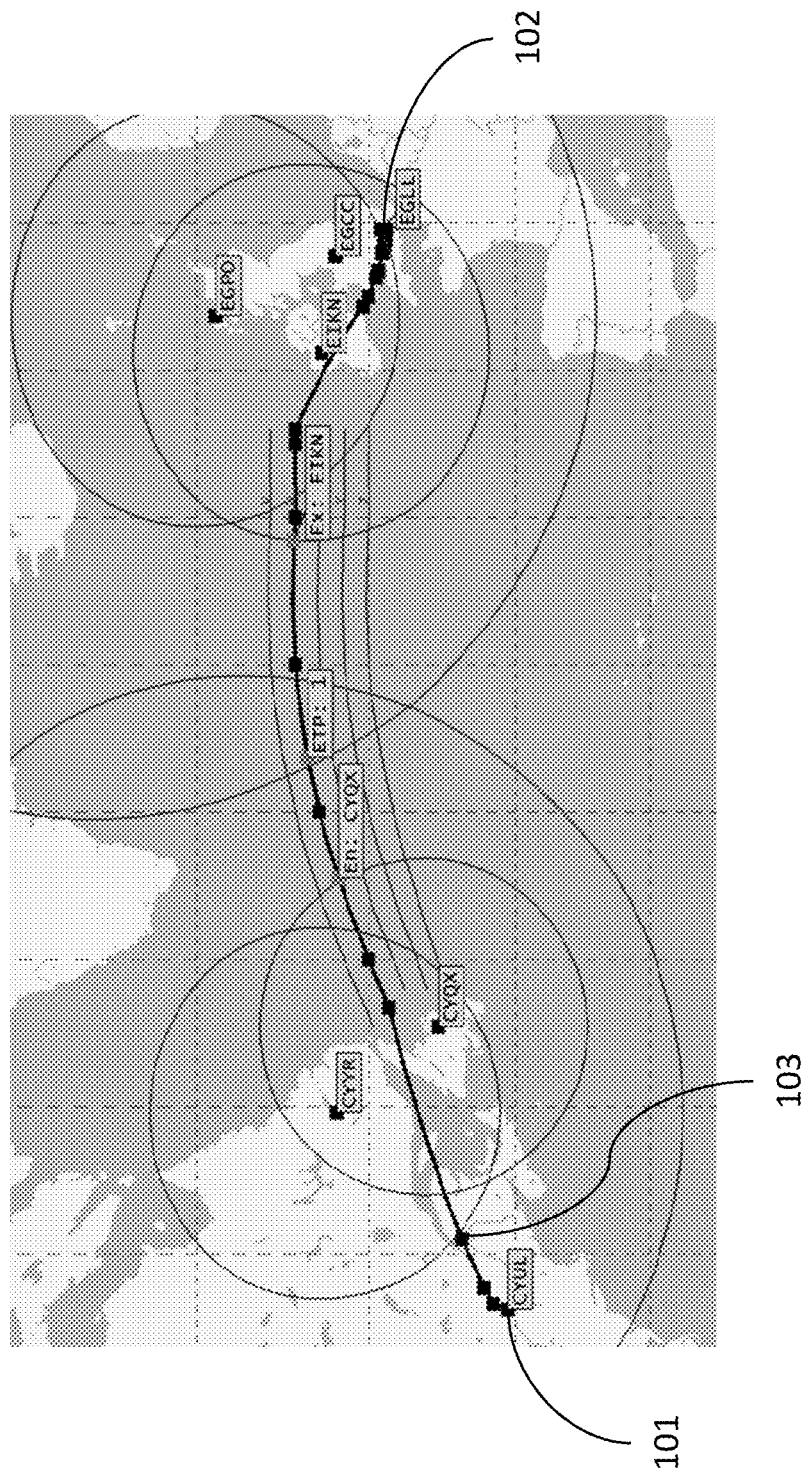
FIG. 1 is a view of a flight plan visualized on a map.

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

With reference to FIG. 1, shown is a view of a flight plan visualized on a map. Before flight, flight operators, such as airliners, may provide flight plans so that the flight plans may be used in the aircraft during flight. These flight plans contain a starting point 101, an ending point 102, and waypoints 103 between the starting and ending points. These starting and ending points 101 and 102 and the waypoints 103 may be represented by latitude and longitude points (coordinates). The flight plan may be provided by a third party, or may be created by flight crews. The flight plans may be retrieved from databases of the flight operators or the third party, or from a database in the aircraft such as a database included in a flight deck system. The flight plan may be created by the flight operators or flight crews aboard the aircraft. The flight plan may be created using a third-party flight-plan software program and retrieved from that program. The flight plan may comply with rules and regulations of controlling airspaces of regions through which the aircraft may pass. The latitude and longitude points of the flight plan may be visualized as a flight path on a map. FIG. 1 shows an exemplary flight path with a starting point 101, ending point 102, and a plurality of waypoints 103 connecting the starting point 101 to the ending point 102. The starting point 101 may be an airport from which aircraft departs, and the ending point 102 may be a destination airport.

Figure 5:
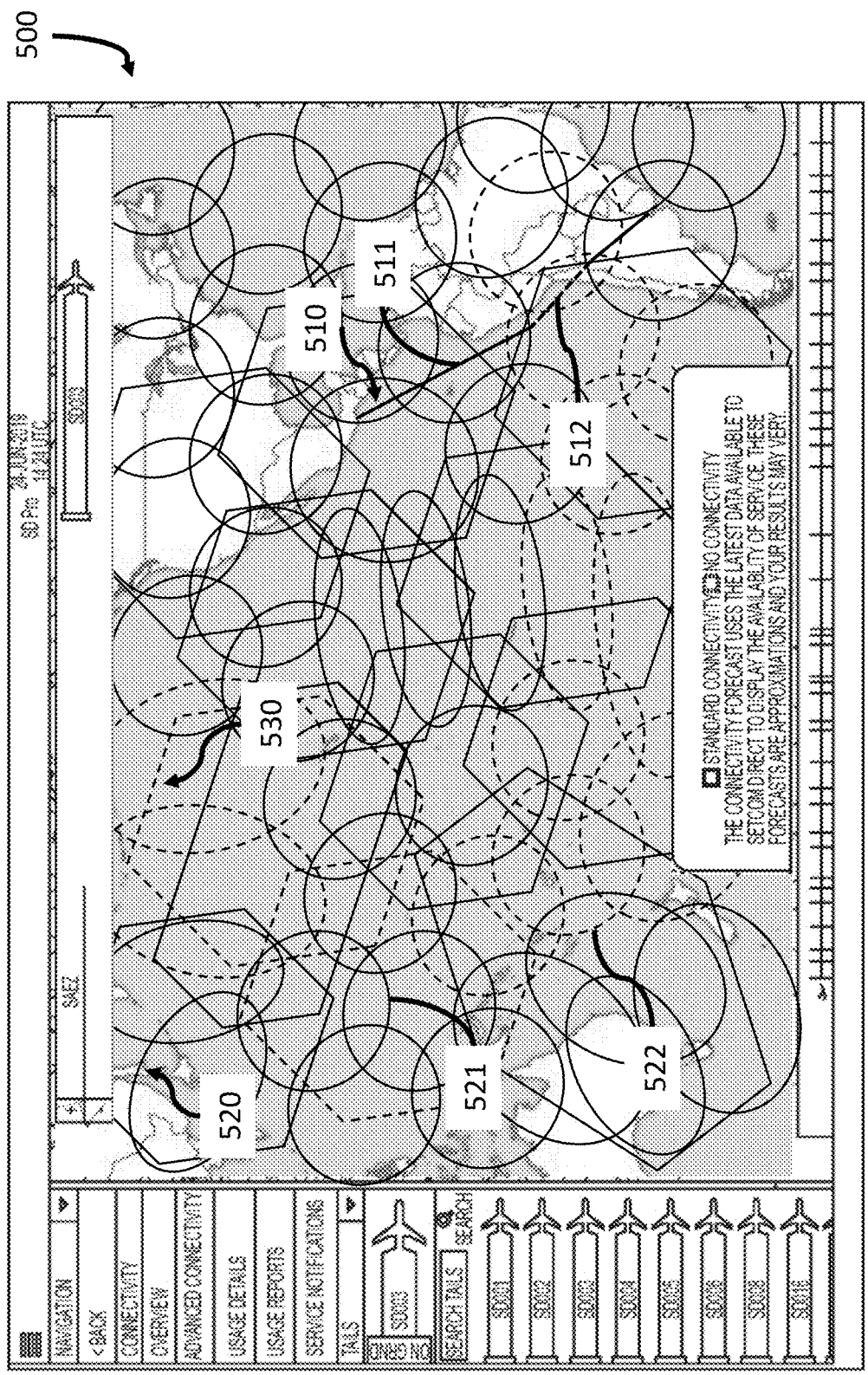
FIG. 5 shows an exemplary screen illustrating flight path and coverage maps coupled together and visualized on a map.
Figure 7:
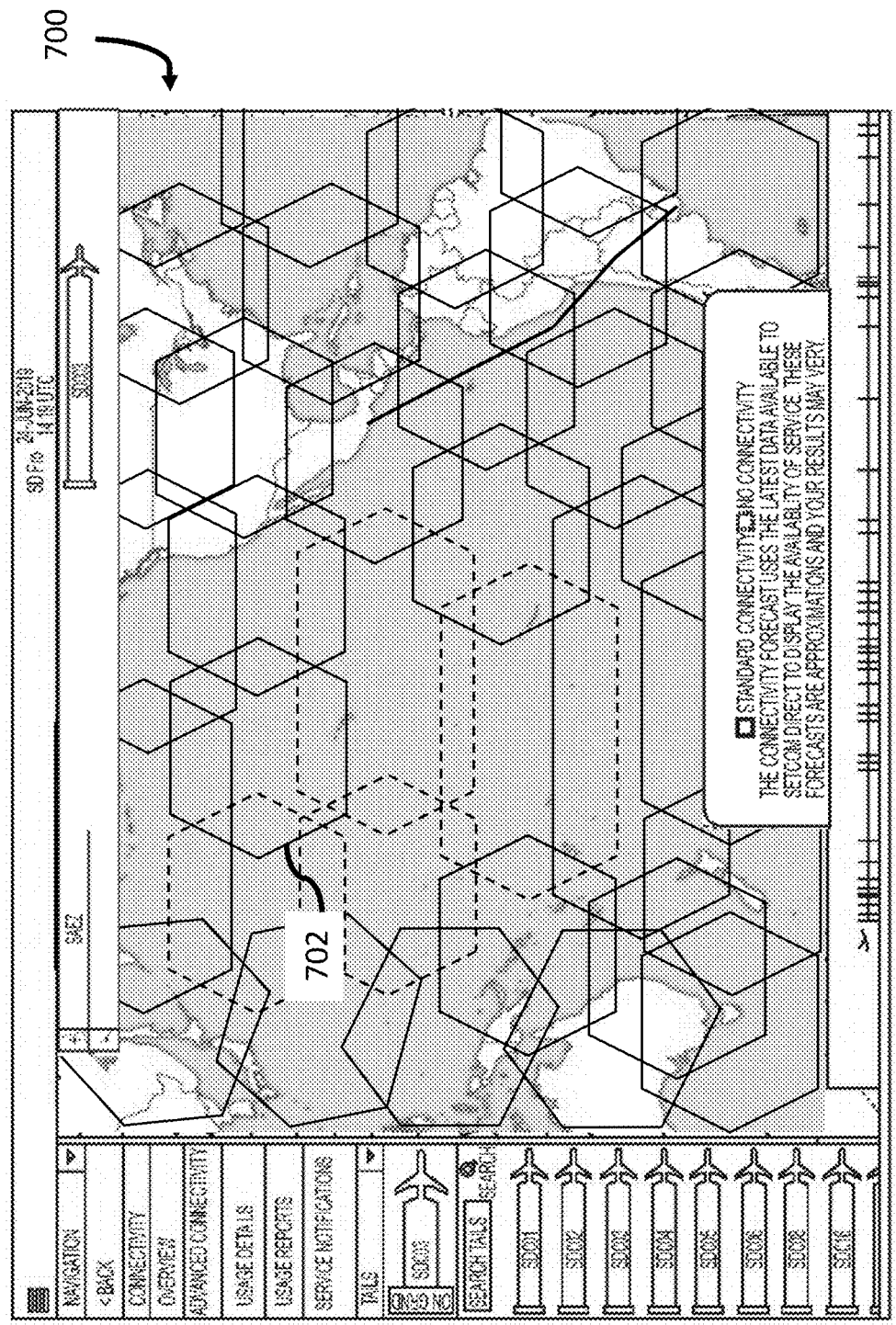
FIG. 7 shows another coverage map where the coverage cells are shown as honey-comb shapes on a map.

Satellite Internet providers may supply coverage data for their partners in certain formats such as keyhole markup language (KML) files. These files provide shapes representing geographical areas. The coverage data may include global geographical regions in which services are available. The coverage data may be represented on a map as coverage maps visualizing geographical regions in which the satellite Internet services are provided. However, the coverage data may include local areas in which satellite Internet services are disabled temporarily or for a certain time period. The coverage data may include a plurality of sub-coverage data that may include further specific information such as service availability, geographical regions which the sub-coverage data cover, and attribute of the services such as strength of data signals and data transfer speed. The sub-coverage data may be represented on a map as coverage cells. FIG. 5 shows exemplary coverage cells 521 and 522 that are represented in oval shapes. FIG. 7 shows exemplary coverage cells 700 that are represented in honey-comb shapes (FIG. 5 actually shows a combination of oval-shaped and honey-comb shaped sub-coverage cells; the different shapes may represent Internet coverage data of different satellite Internet providers). The sub-coverage data, and therefore the coverage cells, may be deployed to overlap each other, so that satellite Internet services and/or information about availability of the Internet services may be continuously provided while aircraft passes from one coverage cell to another coverage cell. The coverage data may be provided by satellite Internet providers before flight or during flight, through communication, by embodiments of systems, devices, and methods for determining and forecasting how an aircraft's flight path will affect the availability of internet services of aircraft passengers described herein, with the satellite Internet providers, to continuously supply updated coverage information during flight.

Figure 2A:
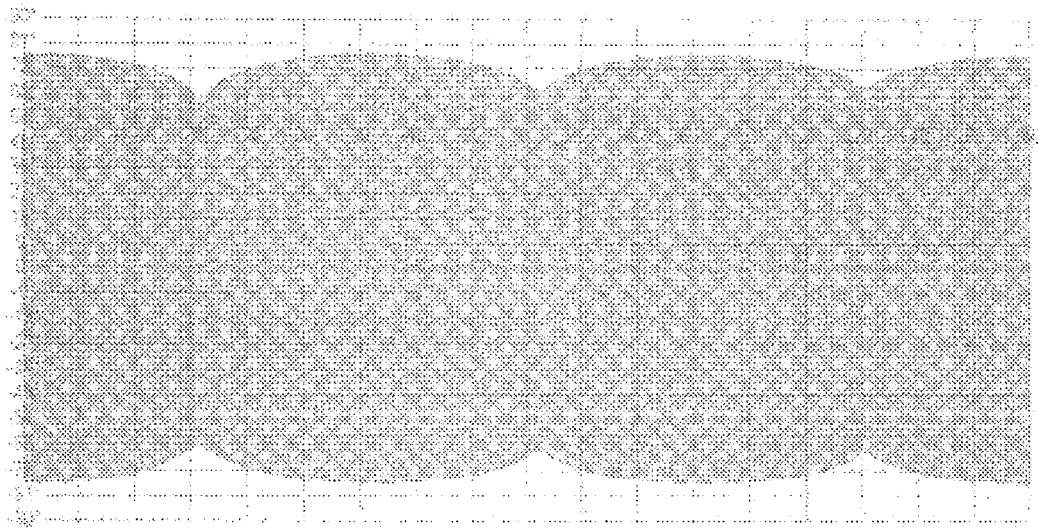
FIG. 2A shows a first step where initial coverage maps in keyhole markup language (KML) are transformed into the database as spatial data.
Figure 2B:
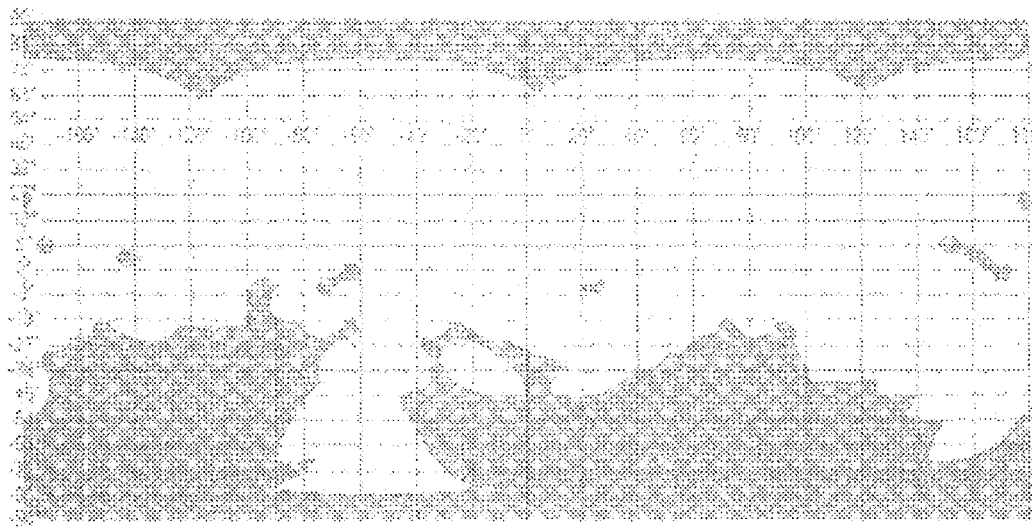
FIG. 2B shows a second step where outage maps in KML format are transformed into the database as spatial data.
Figure 2C:
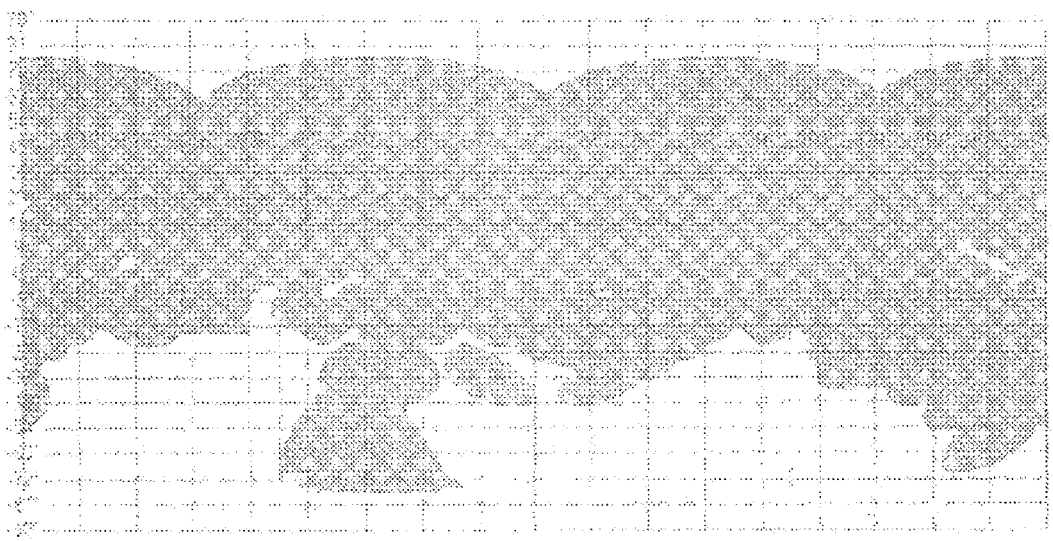
FIG. 2C shows a third step where the coverage and outage maps that are stored in the database as spatial data are combined to show the true coverage areas.

With reference to FIG. 2A, shown is an exemplary initial coverage map where coverage data is transformed into a visualization of spatial coverage data. This data may be stored in a database as spatial data and the spatial coverage data is visualized on a map. This spatial data map signifies the full capability of the coverage range of the satellites. FIG. 2B shows an exemplary outage map where outage data, which indicate no coverage, are transformed into a visualization of outage data which is stored in a database as spatial data and the spatial outage data is visualized on a map. This spatial outage data map signifies the areas that are known to have no service coverage. FIG. 2C shows an exemplary true coverage map in which the initial coverage map and the outage map, which are stored in the database as spatial data, are combined to provide status of service that may include geographical regions in which the services are available.

The connectivity forecast system of the disclosed invention utilizes flight plans and coverage data described above to provide flight crews or passengers aboard the aircraft with status of satellite Internet service availability during flight, which enables to forecast whether the aircraft is approaching a service unavailable region and to estimate when the service would be unavailable. For this purpose, the connectivity forecast system couples the flight plans with the coverage data and also with current location of the aircraft to determine service availability through the flight path.

Figure 3:
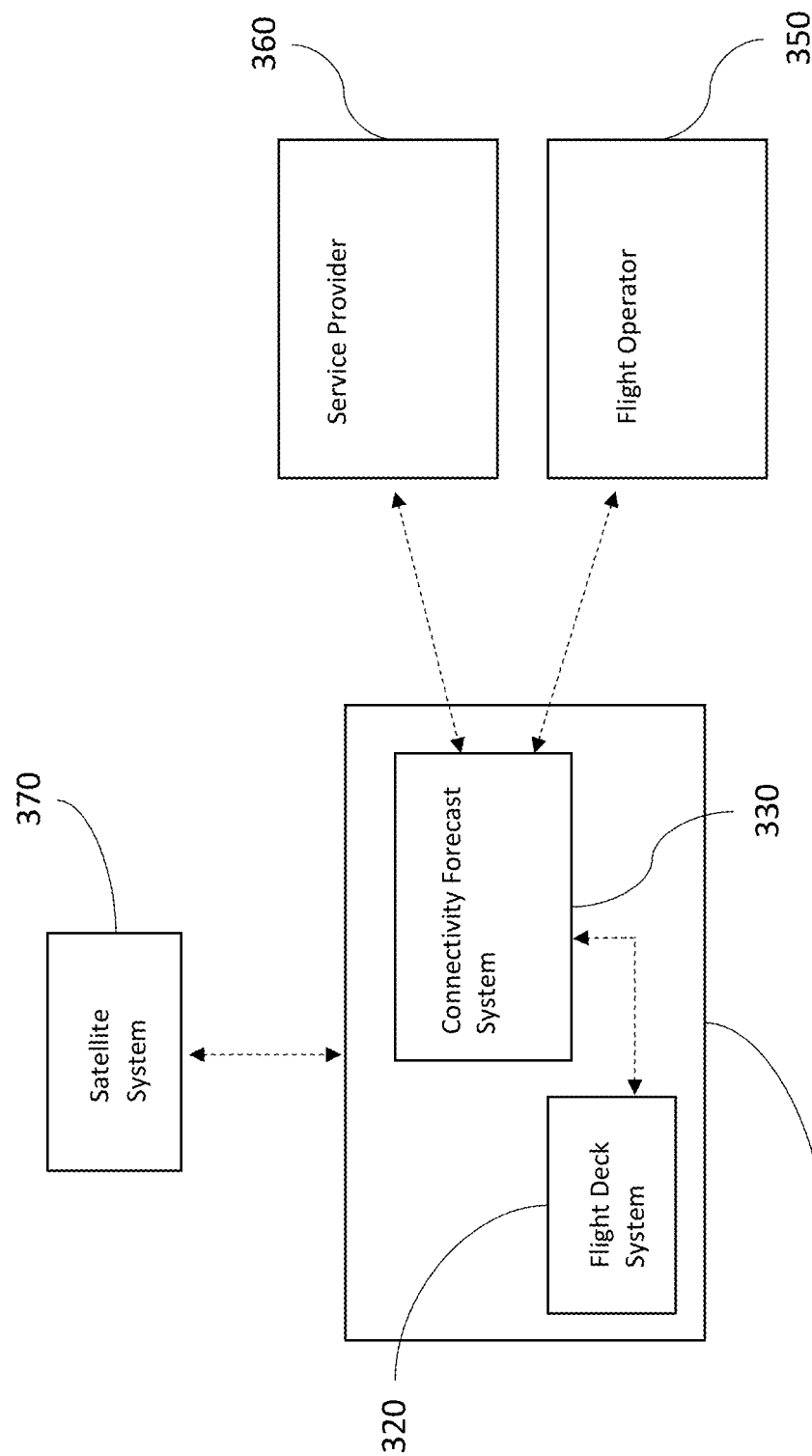
FIG. 3 shows a diagram that illustrates the connectivity forecast system of the disclosed invention interacting with service providers and flight operators.
Figure 4:
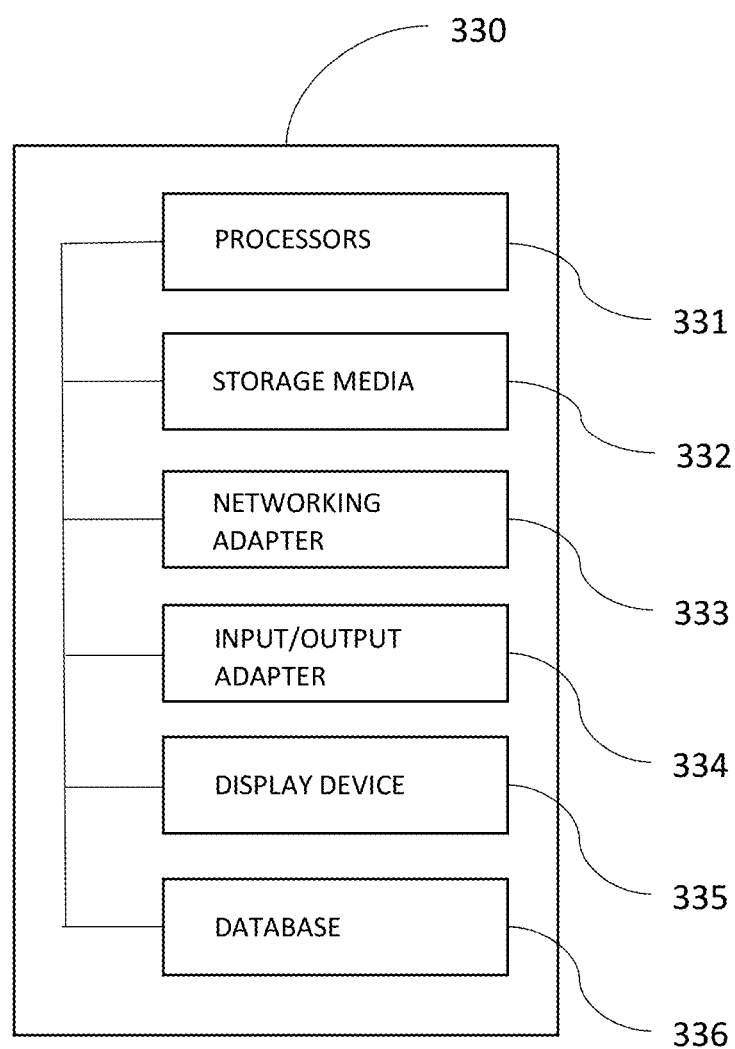
FIG. 4 shows a diagram illustrating hardware elements of the connectivity forecast system.

With reference to FIG. 3, shown is a diagram that illustrates the connectivity forecast system interacting with service providers and flight operators. With reference to FIG. 4, shown is a diagram illustrating hardware elements of the connectivity forecast system. The connectivity forecast system 330 may be carried by or equipped in aircraft 310 during flight. The connectivity forecast system may be included in a hand-held device or may be fixedly equipped at a flight cockpit deck system. The connectivity forecast system 330 may communicate with the flight operator 350 to retrieve flight plans from a database of the flight operator. If the flight plan is created by flight crews and stored in a device such as flight deck system 320, the connectivity forecast system 330 may retrieve the stored flight plan from the flight deck system 320. The flight plan may be created using a third-party flight-plan software program and retrieved from that program. The retrieved flight plans may be stored in storage medium 332, such as memories, or database 336 of the connectivity forecast system 330. The connectivity forecast system 330 may convert the retrieved flight plan data into coordinate data, or otherwise determine coordinate data from the retrieved flight plan, that allows the connectivity forecast system 330 to determine the geographic location of the beginning of the flight path, each waypoint on the flight path, and the end of the flight path. If the flight plan is changed during flight by the flight operator or flight crews, the connectivity forecast system 330 updates the flight plan.

The connectivity forecast system 330 communicates with satellite Internet service providers 360 to retrieve service coverage data. The connectivity forecast system 330 may communicate with systems such as servers or databases of the Internet service providers 360 to retrieve service coverage data. This communication with the service providers may be performed in real time to update the coverage data as soon as the updated coverage data is available from the service providers. The retrieved service coverage data may be stored in the storage medium 332, such as memories, or database 336 of the connectivity forecast system 330. These retrieval processes of the flight plans and coverage data may be performed wirelessly or by wired connections through the networking adaptor 333 or input/output adaptor 334 of the connectivity forecast system 330.

During flight, the aircraft 310 may communicate with satellite systems 370 to obtain flight information related to the flight operation such as current location of the aircraft. The flight information received from the satellite system 370 may be stored in a device such as the flight deck system 320 of the aircraft 310. The connectivity forecast system 330 may maintain communications with the flight deck system 320 during flight, and some of the flight information may be transferred to the connectivity forecast system 330 through the networking adaptor 333 or input/output adaptor 334. Alternatively, the connectivity forecast system 330 may directly communicate with the satellite system 370 or ground systems (not shown) to obtain necessary flight information such as the current location of the aircraft. The connectivity forecast system 330 may communicate with global positioning system (GPS) to find the location of the aircraft 310 that carries the connectivity forecast system 330. This location is preferably displayed on the flight path and updated throughout the flight.

Referring to FIG. 4, the connectivity forecast system 330 includes one or more storage media 332 that may include memories and/or hard disk drives. The storage media 332 store software or computer programs including instructions that perform necessary processes, when executed by one or more processors 331, to provide availability of satellite Internet services. The connectivity forecast system 330 may include display device 335 to display information related to status of the services and other flight information. The connectivity forecast system 330 may visualize the aircraft's projected or planned flight path that is generated by using the flight plan, and may display current location of the aircraft on a map. The connectivity forecast system 330 may display service coverage map that is generated by using the coverage data. The flight path is coupled with the coverage map to visualize portions of the flight path in which the services are available. These portions of the flight path may be color coded according to the availability of Internet services along the flight path. Alternatively, these portions of the flight paths may be shown by other representations, such as but not limited to showing connectivity in solid lines, dotted lines, and the like. When the connectivity forecast system receives multiple coverage data from different service providers, the multiple coverage data may be visualized as multiple coverage maps with different color codes or with different visual representations. FIG. 5 shows exemplary two coverage maps 520 and 530 that includes oval shaped coverage cells and honey-comb shaped coverage cells, respectively.

The connectivity forecast system of the disclosed invention couples the flight plans and the coverage data to provide status of service availability during flight or on ground, and to forecast service availability through flight path based on current location of aircraft that carries the connectivity forecast system.

In embodiments, connectivity forecast system 330 may monitor the actual Internet connectivity of the airplane on which connectivity forecast system 330 is operating. Connectivity forecast system 330 may store this actual Internet connectivity data and transmit it, e.g., through an Internet connection, to other connectivity forecast systems 330 operating on other airplanes. Consequently, connectivity forecast system 330 may also receive feedback data from other connectivity forecast systems 330 operating on other airplanes about the actual Internet connectivity experienced by other airplanes operating along or near the flight path of the airplane on which connectivity forecast system 330 operates. Consequently, connectivity forecast systems 330 may use this data for calculating and visualizing Internet connectivity.

Figure 6:
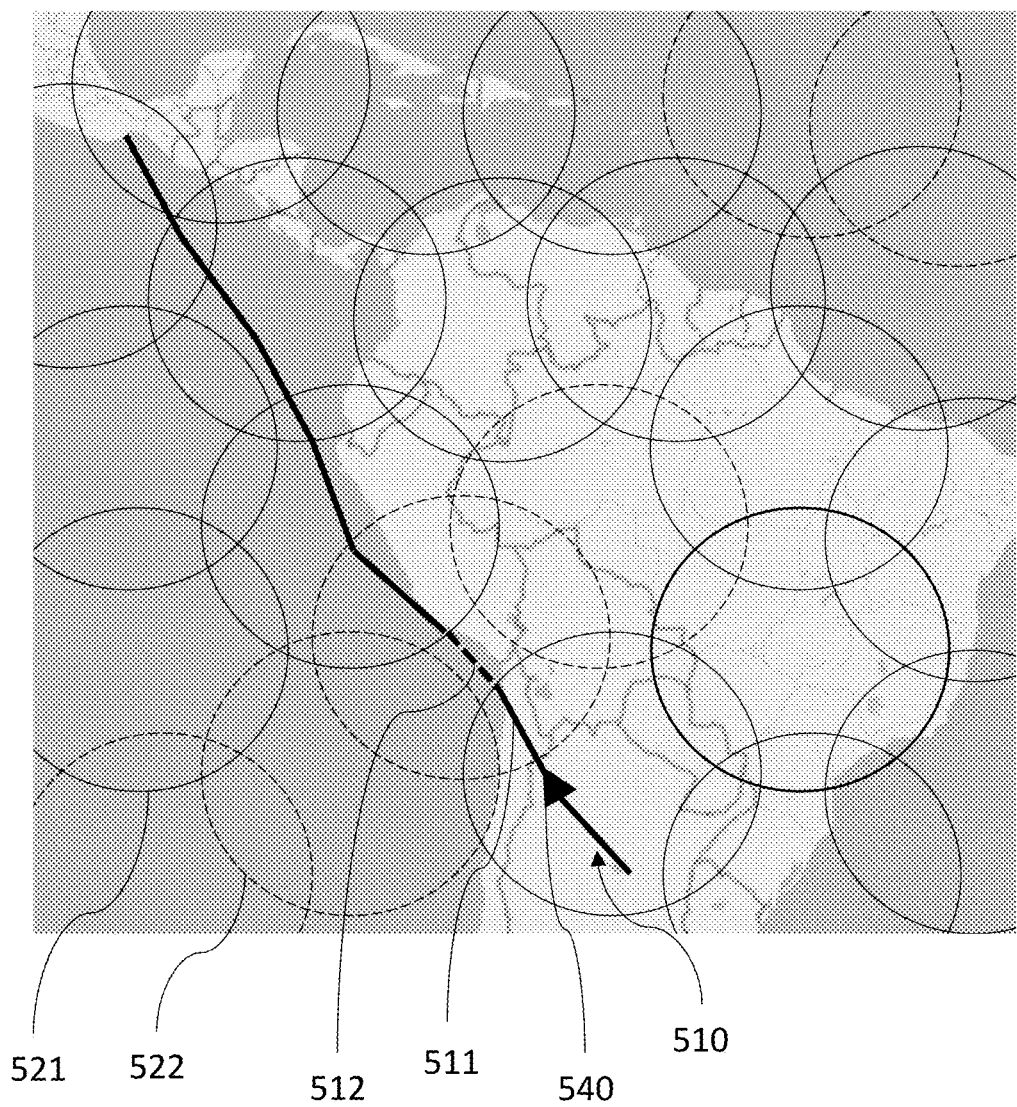
FIG. 6 shows a detailed exemplary figure of the flight plans and coverage maps coupled together.

With reference to FIG. 5, shown is an exemplary screen illustrating flight plans and coverage data that are coupled together and visualized on a connectivity visualization map 500 as flight path and coverage maps, respectively. FIG. 6 shows an detailed exemplary illustration of a flight path and coverage maps coupled together. The screen in FIG. 5 shows two coverage maps 520 and 530 each of which cover global geographical regions. The two coverage maps 520 and 530 may represent different service provides or different data services from the same service provider. FIG. 5 shows two coverage maps (i.e., spatial coverage data for two satellite Internet providers), but the number of coverages maps are not limited. One or more coverage maps may be coupled with the flight plans, and may be displayed in the display device 335 of the connectivity forecast system 330. The first coverage map 520 is represented with oval shape coverage cells 521 and 522, and the second coverage map 530 is represented with honey-comb shaped coverage cells. The coverage cells 521 represent areas where satellite Internet services are available, and the coverage cells 522 represent areas where the satellite Internet services are not available. In an embodiment, the coverage cells 521 and coverage cells 522 are color-coded with different colors to indicate availability (e.g., the coverage cells 521 may be green) and lack of availability (e.g., the coverage cells 522 may be red), respectively. FIG. 5 also shows an integrated flight path 510 in which flight path is coupled or integrated with the coverage map 520, details of which are shown in FIG. 6. The integrated flight path 510 is generated to visualize service available flight path and service unavailable flight path. The integrated flight path 510 includes portions of the flight path in which Internet services are available 511 and portions of the flight path in which Internet services are not available 512. Like the coverage cells 521 and 522, the portions of the flight path 510 and 511, may be color coded to indicate on which portions Internet services are available (e.g., portions 511 may be green) and which portions Internet services are not available (e.g., portions 512 may be red).

In an embodiment, the minimum size of the portions 511 and 512 illustrated on the flight path 510 may the distance between any two consecutive waypoints on the flight path 510. Alternatively, the connectivity forecast system 330 may calculate additional coordinates on the flight path 510, determine Internet availability between such additional coordinates, and depict portions 511 and 512 between such coordinates, thereby displaying smaller portions 511 and 512 and greater granularity. Additionally, Internet availability on the flight path 510 may not be a binary available/not-available between each waypoint or additional coordinate; for example, location of a flight path on a boundary between available coverage cells 521 and unavailable coverage cells 522, local weather conditions, and/or other factors may impact Internet availability on a more granular level then can be displayed by coverage cells 521 and 522 and portions 511 and 512. The connectivity forecast system 330 may calculate such coverage forecast using interpolation algorithms to generate intervening waypoints (additional coordinates) between waypoints. The connectivity forecast system 330 may also determine this through feedback received from other airplanes operating connectivity forecast systems 330, from Internet satellite providers, based on weather data received, or other information. Accordingly, portions 511 and 512 may include shading (e.g., lighter green or lighter red) or other colors (e.g., yellow) that indicate less than full or substantially full Internet availability based on the calculations performed using interpolation algorithms or other data.

Referring to FIG. 6, shown are coverage cells 521 and 522 covering a geographical regions. The coverage cells overlap each other. If an area is covered by a service available coverage cell 521, the displayed connectivity visualization map 500 indicates that service is available in the area. If an area is covered only by a service unavailable coverage cell 522, connectivity visualization map 500 indicates that service is not available in the area. The flight path may be formed through service available coverage cells 521 and service unavailable coverage cells 522. The portion of the flight path, which is not covered by any service available coverage cells 521 is marked with a dashed line 512, while portions of the flight path, which are covered by at least one service available coverage cells 521 are marked with a solid line 511. The dashed portion 512 of the flight path indicates that satellite Internet services are not available while the aircraft 540 flies along the portion 512 of the flight path. The solid portion 511 of the flight path indicates that the Internet services are available while the aircraft 540 flies along the portion 511 of the flight path.

For more accurate calculation of the service unavailable flight path 512, the connectivity forecast system may use interpolation algorithms to generate intervening waypoints between waypoints. With the intervening waypoints, the points of the flight path that touch the boundaries of the service available and unavailable coverage cells may be more accurately calculated. As noted above, unavailable flight path portions 512 may include shading (e.g., lighter green or lighter red) or other colors (e.g., yellow) that indicate less than full or substantially full Internet availability. Additionally, based on the current location of the aircraft 540 and other flight information such as speed of the aircraft that can be obtained through communications with the flight deck system, the connectivity forecast system may be able to forecast approximate time period before reaching the service unavailable flight path. Therefore, users in the aircraft may be prepared for the disruption of the Internet services.

Referring back to FIG. 5, the connectivity forecast system of the disclosed invention may utilize multiple coverage maps 520 and 530. The multiple coverage maps may be provided by different service providers, or may be different data services or plans that may be provided by the same service provider. The flight operators may select different service providers or data services while flying over a certain region. The selection may be determined by the flight path integrated with the coverage maps to minimize chances in which no Internet service is available. The connectivity forecast system takes the flight plans provided by flight operators and determines whether the flight path will take the aircraft through any areas known to be without coverage. In this way, the connectivity forecast system may provide the benefit of increasing availability of the Internet services along the flight path by selecting different service providers based on regions.

With reference now to FIG. 7, shown is a connectivity visualization map 700 in which the coverage map includes coverage cells 702 are shown as honey-comb shapes on a map. While the screen in FIG. 5 shows the first and second coverage maps 520 and 530, the screen in FIG. 7 shows one coverage map. The connectivity forecast system has the capability to store multiple coverage maps and couple the stored coverage maps with the flight plan. The flight path 704 is shown traversing multiple coverage cells 702

Figure 8:
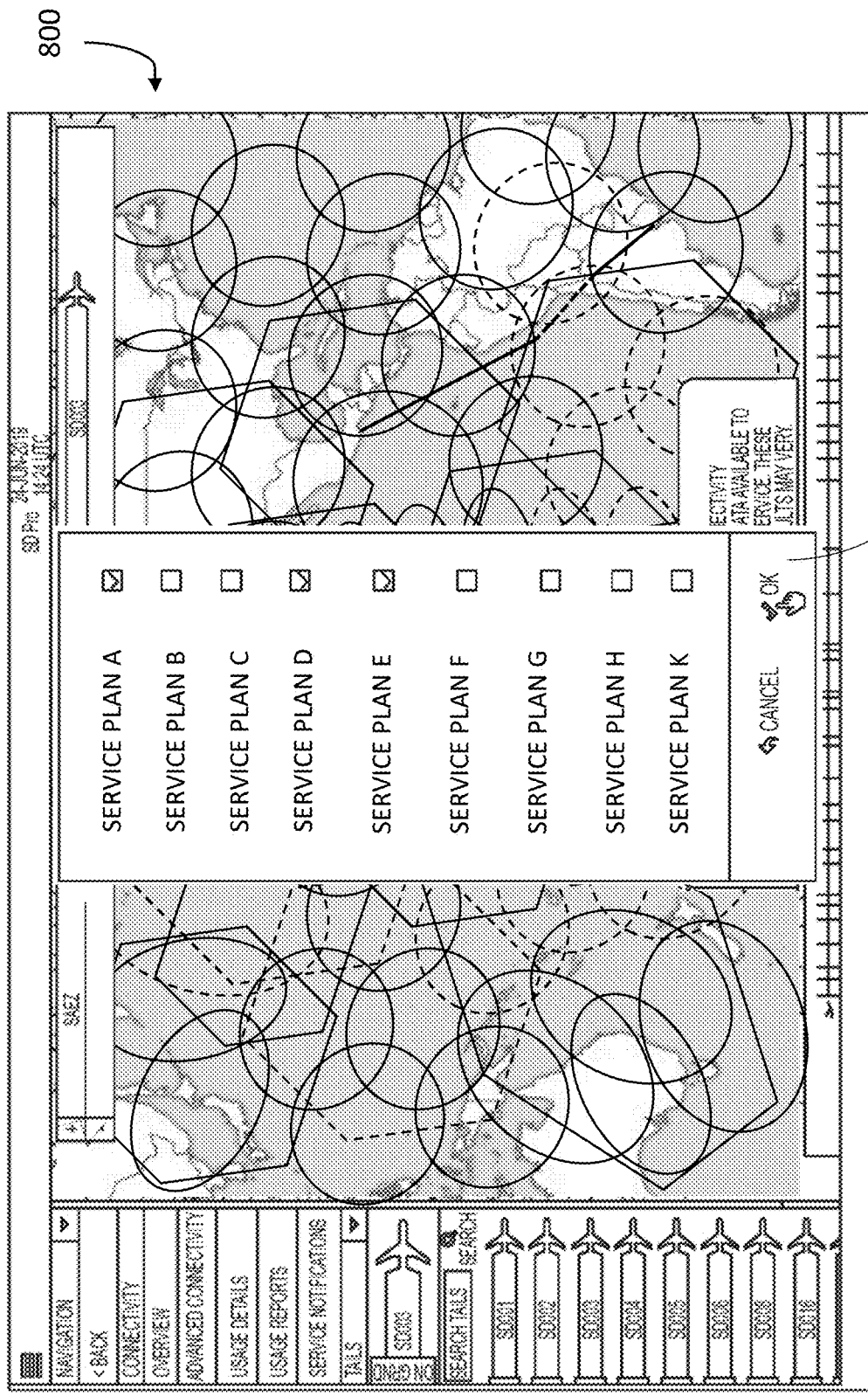
FIG. 8 shows a menu displayed on the top of the map, which shows available service plans that can be selected by a user.

With reference now to FIG. 8, shown is a menu 802 (e.g., a drop-down menu) overlaying the connectivity visualization map 800 to select service providers or other data services. The menu 802 shows available Internet provider services that can be selected by a user. The available provider services may be provided by the same or different Internet service providers. As shown, the menu allows selection of spot beams; spot beams enable determination and visualization of the Internet coverage cells (e.g., 521 and 522) described herein. The non-spot beams may show less granular Internet coverage. The available services may be selected, for example, to review and compare service destruction regions based on the flight plan to minimize chances in which no Internet service is available.

Figure 14:
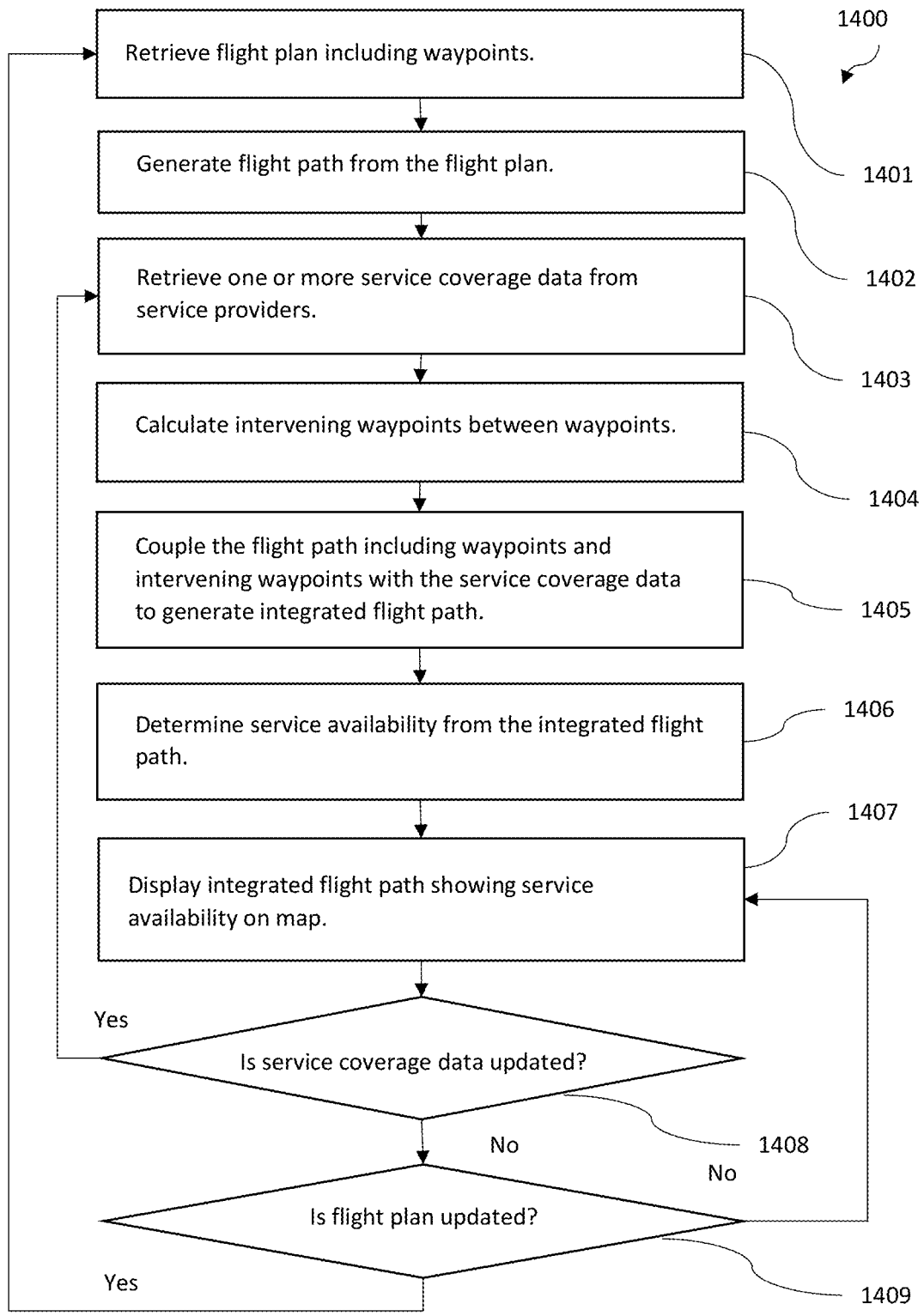
FIG. 14 shows a workflow diagram illustrating processes for forecasting availability of network services.

With reference to FIGS. 4 and 14, the disclosed invention provides the connectivity forecast system 330 to provide users aboard aircraft with status of network services. The disclosed invention also provides method for providing users aboard aircraft with status of network services. The connectivity forecast system includes a non-transitory storage medium 332 to store executable instructions and one or more processors 331 to execute the executable instructions that cause the one or more processors 331 to perform operations based on the instruction. The connectivity forecast system 330 communicates with service providers 360, and may communicate with a flight operator. With reference to FIG. 14, shown is an embodiment of a method 1400 for forecasting availability of network services during flight. In order to provide the users with the status of the network services, a flight plan including one or more waypoints is retrieved, block 1401. From the flight plan, a flight path is generated, block 1402. The flight path includes the one or more waypoints. One or more service coverage data is retrieved from the service providers, block 1403. The one or more service coverage data is transmitted from the service providers 360 and the service coverage data may include a plurality of sub-coverage data. In embodiments, in order to generate visualization of portions, or more granular portions, of the flight path in which service is not available or is not 100% available, intervening waypoints (additional coordinates) are calculated, e.g., using interpolation algorithms or other methods, block 1404. The intervening waypoints are additional coordinates with closer intervals than the waypoints provided with the flight path. The intervening waypoints may be added into the flight path in addition to the existing waypoints. The flight path including the waypoints and the intervening waypoints is coupled or combined with the service coverage data to generate an integrated flight path (i.e., the visualization of the flight path with availability and unavailability indicated), block 1405. The integrated flight path indicates service available and unavailable portions of the flight path. From the integrated flight path, service availability over regions is determined, block 1406.

The integrated flight path showing service availability is displayed on a map (e.g., on a visual display on flight deck of plane), block 1407. Alternatively, the information of the service availability may be emailed to the users at a predetermined time period. Displaying 1407 the integrated flight path may comprise receiving GPS data of the plane, determining the location of the plane on the integrated flight path, and displaying the location of the plane on the integrated flight path. The location of the plane on the flight path is preferably constantly updated during the flight. Periodically or upon receiving information from the service providers or other sources (e.g., feedback from other connectivity forecast systems 330), method 1400 may check to see if the service coverage data has been updated, block 1408. If the service coverage data is updated 1408, the updated coverage data is retrieved from the service provider or otherwise determined (e.g., calculated from other sources) and method 1400 may repeat processes 1403-1407 with the updated service coverage data. In this manner, the connectivity forecast system 330 may provide real-time updates of the Internet connectivity forecast Method 1400 may also periodically check to see if the flight plan/path has been updated, e.g., based on the connectivity forecast shown by the integrated flight path or based on flight controller commands (e.g., due to weather or emergency conditions), block 1409. If the flight plan/path is updated 1409, method 1400 may repeat as shown. In this manner, connectivity forecast systems 330 may update the integrated flight path displayed and the Internet connectivity forecast for the flight path in real-time.

The information of the integrated flight path may include portions of the flight path in which the network service is unavailable. The information may be displayed in the display device 335 of the connectivity forecast system 330. The service available and unavailable portions of the flight path may be shown with different color code or with different visual representations such as solid lines and dotted lines. The information may be sent to the users through emails at a predetermined time period.

The connectivity forecast system of the disclosed invention includes an advanced connectivity module where customers are able to monitor the heartbeat of the cabin in real time from anywhere in the world. Several attributes are implemented which include usage analysis, connectivity forecast and flight monitoring emails.

Usage Analysis. The advanced connectivity module breaks down the data used on the aircraft into a user-friendly display. Protocol analysis is included to show what type of data traffic was passed.

Connectivity Forecast. Simply select a flight plan and be presented with an overview of the flight path and time period in which passengers may or may not expect to have access to a certain network.

Flight Monitoring Emails. Passengers can sign up to receive automated updates from the connectivity forecast system while the aircraft is in flight. Updates are delivered to the email inbox of passengers and include flight tracking, data usage, and protocol analysis.

Figure 9:
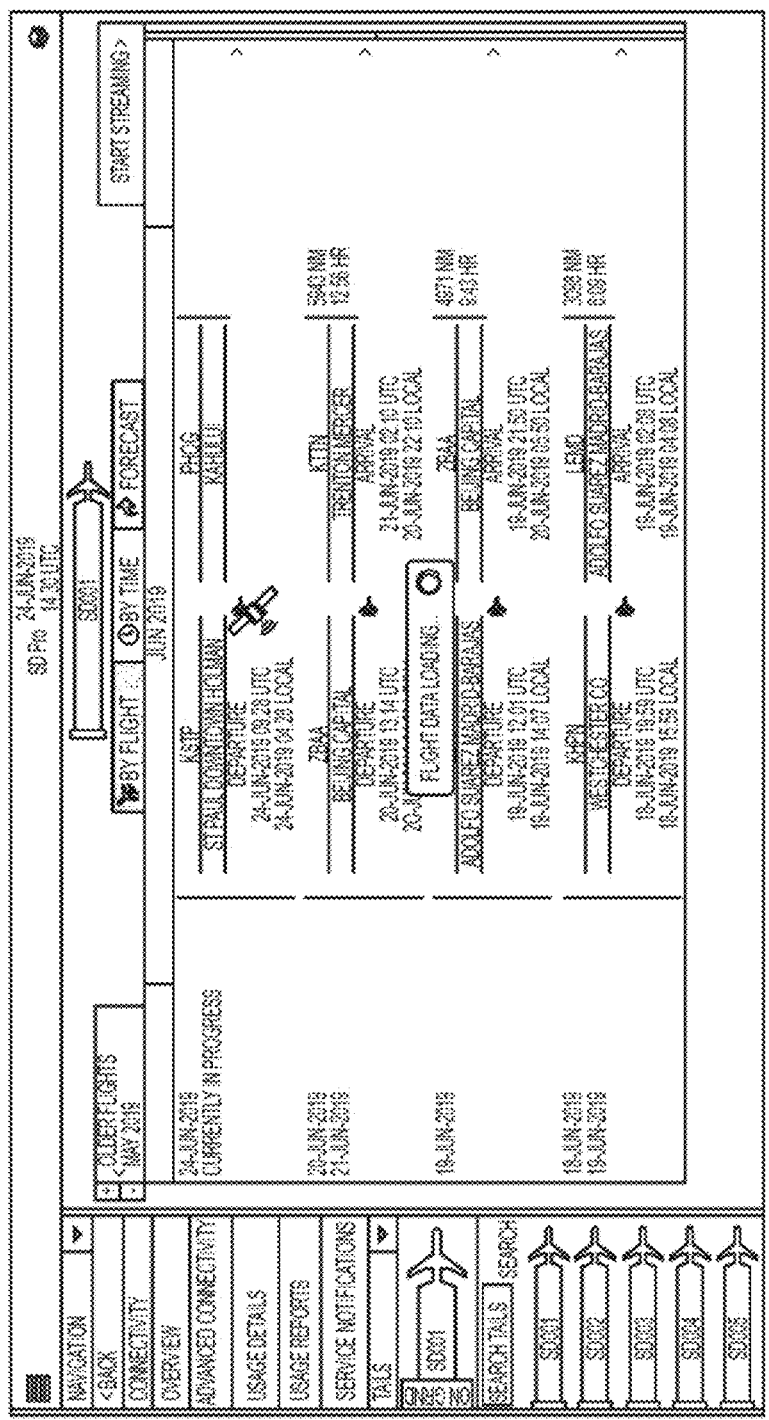
FIG. 9 shows a screen shot of the connectivity page display of SD PRO (SATCOM DIRECT), which is the connectivity forecast system, with three options: "By Flight", "By Time", and "Forecast."

With reference now to FIG. 9, shown is a connectivity page display of SD PRO (SATCOM DIRECT), which is an embodiment of connectivity forecast system, with three options: "By Flight", "By Time", and "Forecast." These options are shown below the tail number "SD001." By default, "By Flight" may be selected and the user may see a list of flights from the current month. Selecting "By Time"

will allow the user to specify a start and end time for the usage analysis. Such usage analysis may include past flight paths with Internet connectivity information. Selecting "Forecast" will take the user to the Connectivity Forecast page.

Figure 10:
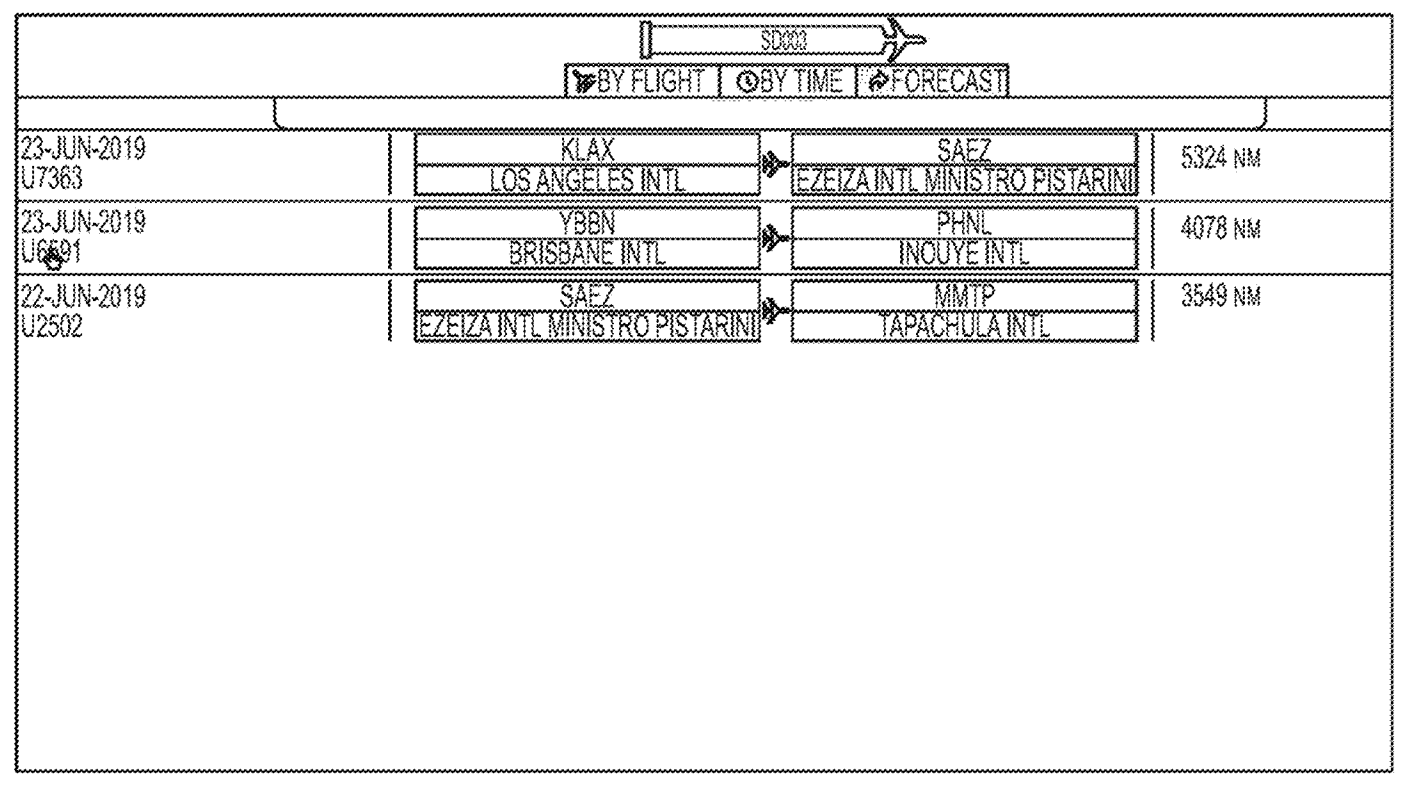

With reference now to FIG. 10 shown is a connectivity page display of SD PRO where "Forecast" is selected. From this page, an upcoming flight plan may be selected, which will cause the generation and display of a connectivity visualization map.

Figure 11:
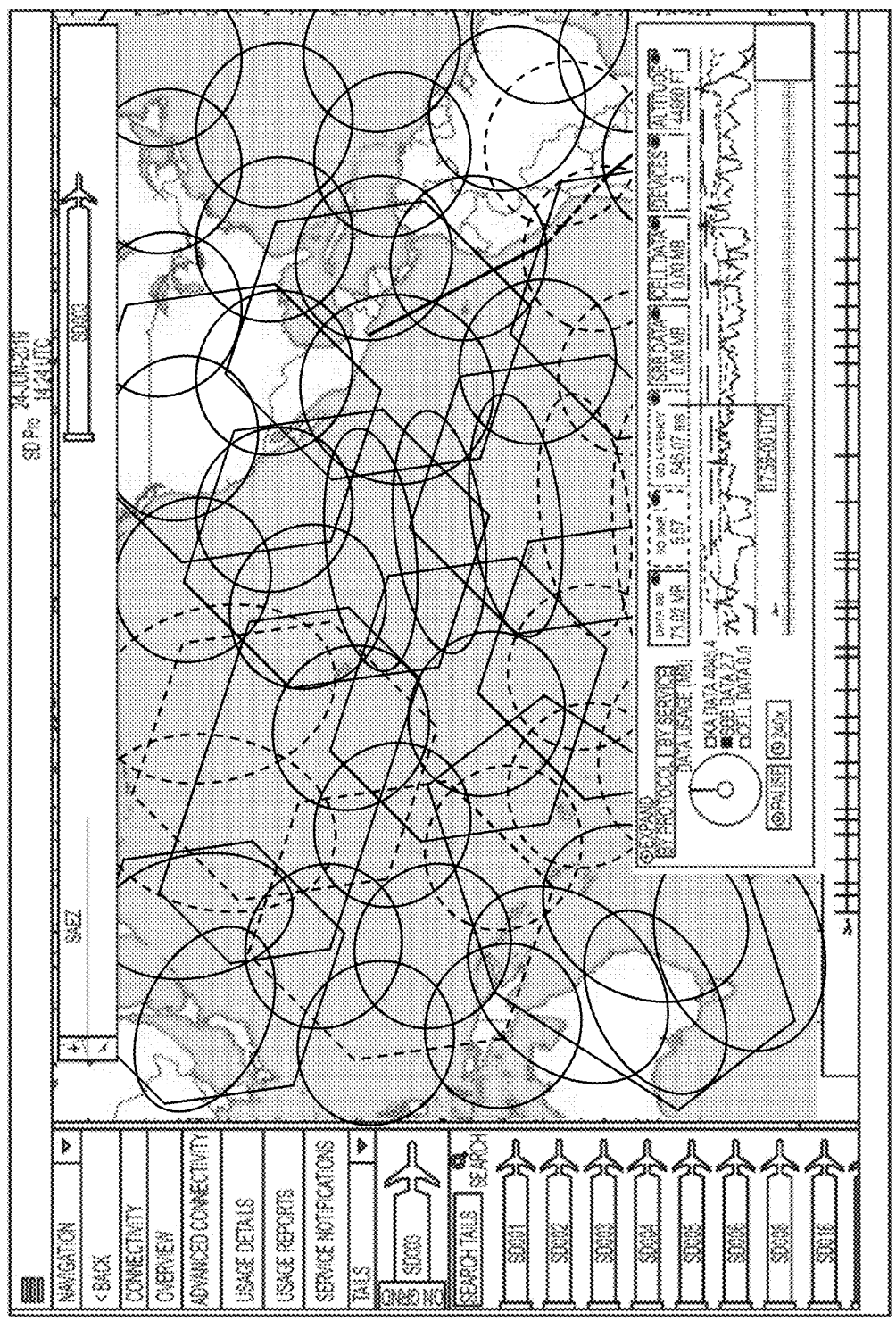
FIG. 11 shows a graph display screen visualizing flight and data service information.

FIG. 11 shows a graph displayed at a bottom of a connectivity visualization map. The graph shows flight information and network service information. Users may choose which items to display on the graph by touching the color-coded legend above the graph. Selecting the protocol analysis section will present the user with examples of data traffic for each category of their data. Users may choose to playback their flight by selecting the "Play" button. Playback speed can be controlled by using the button located beside the "Play" button. Selecting any point along the flight path or the usage graph will show the data for that given point in the flight. To return to the previous menu, simply touch the "Back to Flight List" shown under the tail number at the top of the page. In this manner, usage and connectivity analysis may be performed.

Figure 12A:
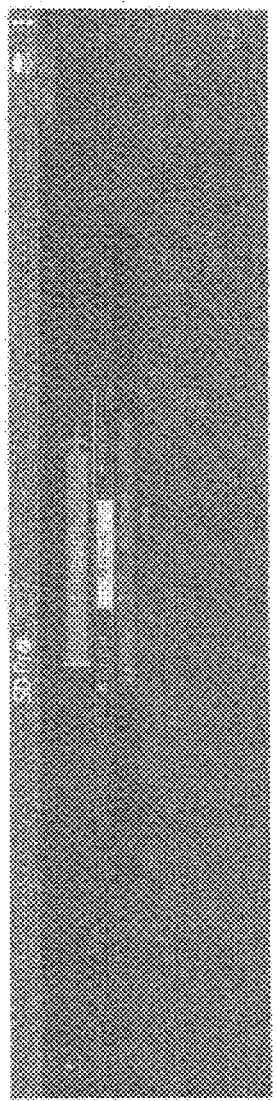
FIGS. 12A and 12B show screens for selecting viewing options by date and time.

FIG. 12A is a screen shot page for selecting viewing options by date and time. "By Time" can be selected from the main advanced connectivity page. This can be used to view any 24 hour window the user prefers.

Figure 12B:
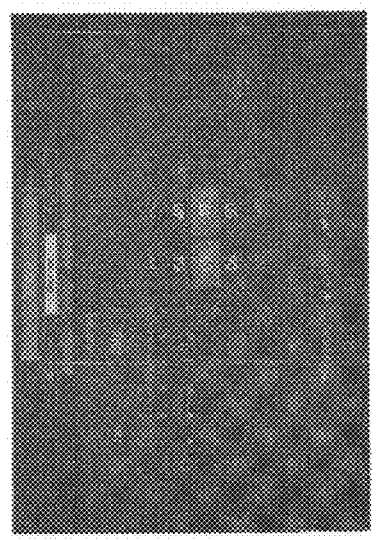

FIG. 12B is a screen shot page showing results of selecting time. After selecting "By Time", select the red "Start Time" box. Enter the time you would like the usage analysis to begin. Select the "Stop Time" box & enter the time you would like the analysis to end. To view an ongoing flight, you can select the current time as the "Stop Time".

Figure 13:
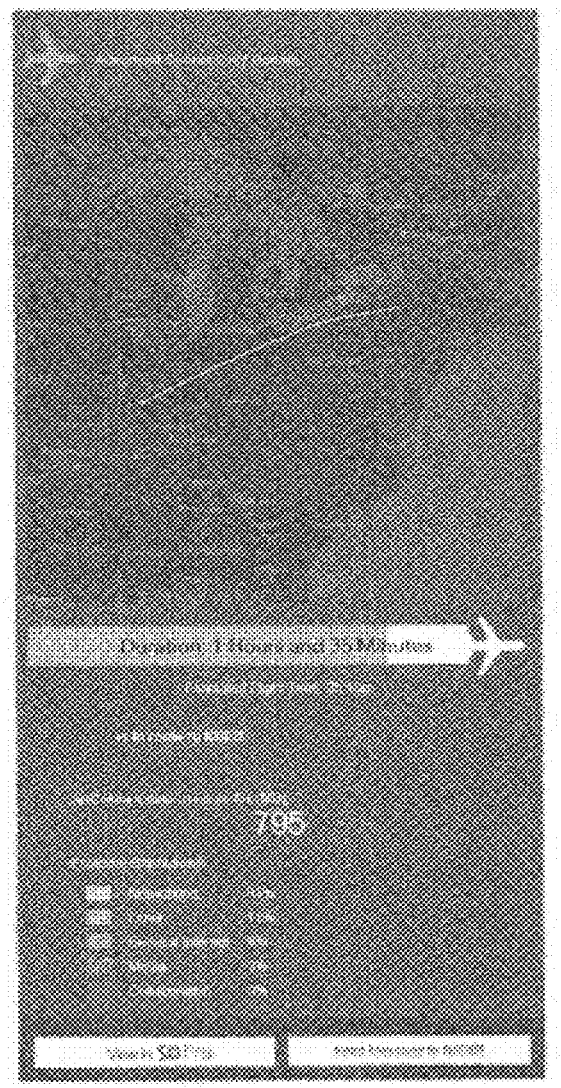
FIG. 13 is a screen shot page for advanced connectivity email updates.

FIG. 13 is a screen shot page for advanced connectivity email updates. Users may set themselves or others up to receive automated flight monitoring emails. Emails may be sent at takeoff, at landing, and at a predetermined time period, for example, approximately 60 minute intervals between takeoff and landing. Emails may contain network data usage (in MB), protocol analysis, aircraft positional data, trip progress indicator.

The term "approximately" can be +/−10% of the amount referenced. Additionally, preferred amounts and ranges can include the amounts and ranges referenced without the prefix of being approximately.

The terms and descriptions used herein are set forth by way of illustration only and are not meant as limitations. Those skilled in the art will recognize that many variations are possible within the spirit and scope of the invention and the embodiments described herein.

What is claimed is:

1. A connectivity forecast system to provide users aboard aircraft with status of network services, the connectivity forecast system communicating with one or more service providers, comprising:
 a non-transitory storage medium to store executable instructions; and
 one or more processors to execute the executable instructions that cause the one or more processors to perform operations to provide the status of the network services, the operations comprising:
  retrieving a flight plan to generate a flight path, wherein the flight path includes one or more waypoints;
  retrieving one or more service coverage data from the service providers, wherein the one or more service coverage data is transmitted from the service providers and the service coverage data includes a plurality of sub-coverage data;
  selecting sub-coverage data that cover regions in which the flight path is formed which indicate regions of unavailability of services;
  coupling the flight path with the service coverage data, including the selected sub-coverage data, to generate an integrated flight path that indicates service available and unavailable portions of the flight path; and
  displaying the integrated flight path.

2. The connectivity forecast system of claim 1 wherein the operations further comprise updating the one or more service coverage data from the service providers during flight.

3. The connectivity forecast system of claim 1 wherein the coupling the flight path comprises interpolating the waypoints to generate intervening waypoints between waypoints.

4. The connectivity forecast system of claim 1 wherein the coupling the flight path comprises:
 selecting sub-coverage data that cover regions in which the flight path is formed;
 determining sub-coverage data, among the selected sub-coverage data, which indicate unavailability of the network services; and
 determining portions of the flight path in which the network service is unavailable.

5. The connectivity forecast system of claim 4 wherein the determining portions of the flight path comprises finding one or more waypoints that are not covered by any of sub-coverage data indicating network service availability.

6. The connectivity forecast system of claim 1 further comprising a display device, wherein the displaying the integrated flight path comprises displaying the integrated flight path on the display device.

7. The connectivity forecast system of claim 1 wherein the connectivity forecast system communicates with global positioning system (GPS) to identify a current location of the aircraft during flight.

8. The connectivity forecast system of claim 7 wherein the current location of the aircraft is shown on the displayed integrated flight path.

9. The connectivity forecast system of claim 1 wherein the connectivity forecast system communicates with a flight operator to retrieve the flight plan.

10. The connectivity forecast system of claim 1 wherein the operations further comprise:
 checking changes of the one or more service coverage data periodically or upon receiving information from the service providers during flight;
 checking changes of the flight plan during flight;
 updating the one or more service coverage data and the flight plan based on the changes during flight; and
 updating the integrated flight path based on the updated one or more service coverage data and flight plan.

11. A method for providing users aboard aircraft with status of network services, comprising:
 retrieving a flight plan to generate a flight path, wherein the flight path includes one or more waypoints;
 transmitting one or more service coverage data from service providers, wherein the service coverage data includes a plurality of sub-coverage data;
 storing the service coverage data in database or one or more memories;
 selecting sub-coverage data that cover regions in which the flight path is formed which indicate regions of unavailability of services;

coupling the flight path with the service coverage data, including the selected sub-coverage data, to generate an integrated flight path that indicates service available and unavailable portions of the flight path; and displaying the integrated flight path.

12. The method of claim 11 further comprising updating the one or more service coverage data from the service providers during flight.

13. The method of claim 11 wherein the coupling the flight path comprises interpolating the waypoints to generate intervening waypoints between waypoints.

14. The method of claim 11 wherein the coupling the flight path comprises:
 selecting sub-coverage data that cover regions in which the flight path is formed;
 determining sub-coverage data, among the selected sub-coverage data, which indicate unavailability of the network services; and
 determining portions of the flight path in which the network service is unavailable.

15. The connectivity forecast system of claim 14 wherein the determining portions of the flight path comprises finding one or more waypoints that are not covered by any of sub-coverage data indicating network service availability.

16. The method of claim 11 further comprising transmitting information including a current location of the aircraft from global positioning system (GPS) during flight.

17. The method of claim 16 wherein the displaying the integrated flight path displays the current location of the aircraft on the displayed integrated flight path.

18. The method of claim 11 further comprising:
 checking changes of the one or more service coverage data periodically or upon receiving information from the service providers during flight;
 checking changes of the flight plan during flight;
 updating the one or more service coverage data and the flight plan based on the changes during flight; and
 updating the integrated flight path based on the updated one or more service coverage data and flight plan.

* * * * *